United States Patent

[11] 3,585,340

[72] Inventor Terry O. Hockenberry
 Pittsburgh, Pa.
[21] Appl. No. 762,259
[22] Filed Sept. 16, 1968
[45] Patented June 15, 1971
[73] Assignees Dr. Everard M. Williams
 Pittsburgh, ;
 Dr. Terry O. Hockenberry
 Fox Chapel, Pa., part interest to each

[54] ELECTRIC DISCHARGE MACHINING CIRCUIT FOR ELIMINATING CONCENTRATED DISCHARGES
12 Claims, 4 Drawing Figs.
[52] U.S. Cl. .................................................. 219/69
[51] Int. Cl. .................................................. B23k 9/16
[50] Field of Search............................................ 219/69 C, 69 F, 69 G, 69 S, 69 V

[56] References Cited
UNITED STATES PATENTS
2,769,078 10/1956 Matulaitis..................... 219/69 (S)
2,951,969 9/1960 Matulaitis et al. ............ 219/69 (C) X
3,259,795 7/1966 Schierholt..................... 219/69 (C) X
3,283,116 11/1966 Scarpelli....................... 219/69 (P)

Primary Examiner—J. V. Truhe
Assistant Examiner—Hugh D. Jaeger
Attorney—Buell, Blenko and Ziesenheim ABSTRACT: The power supply can be used for electric discharge machining (EDM) apparatus and the like, the power supply includes a circuit for establishing repetitive electric discharges across a discharge gap forming part of EDM apparatus. A voltage detecting circuit in coupled across the EDM gap for developing an output signal when the instantaneous voltage across the gap falls below a predetermined level. A control circuit is coupled to the detecting circuit and to the supply circuit for momentarily lowering gap discharge rate until the lowest instantaneous voltage is at or above said predetermined level.

INVENTOR
Terry O. Hockenberry.
BY
HIS ATTORNEYS

ELECTRIC DISCHARGE MACHINING CIRCUIT FOR ELIMINATING CONCENTRATED DISCHARGES

The present invention relates to a power supply circuit for electric discharge machining (EDM) apparatus and the like and more particularly to power supply circuitry designed for eliminating concentrated discharges or sparkovers and the attendant conditions of burr formation and coking. Certain forms of my present invention are particularly useful with the self-timed power supply circuit described and claimed in a copending and coassigned application by myself and Everard M. Williams, entitled "Power Supply Circuitry for Electric Discharge Machining Apparatus and the Like," filed Dec. 19, 1966, Ser. No. 602,724.

In attempts to approach optimum machining rates for various machining conditions and materials, considerable effort has been exerted in this field to increase repetitive discharge rates and the percentage of the charging-discharging cycle in which current flows across the EDM gap (percent duty cycle). For fine machining operations, where extremely rapid repetitive discharge rates are necessarily utilized because of the lower amplitudes of the EDM gap voltages, it is essential to maximize the percent duty cycle of the discharge current in order to achieve acceptable material removal rates.

With increase in percentage duty cycles, phenomena known variously as burring, coking, sludge baking, clinkering, etc. has become evident in recent times. These phenomena apparently result from localized or concentrated repetitive discharges, which differs from DC arcing under certain EDM conditions with a relaxation type power supply. DC arcing involves a sustained current flow and is tantamount to a short circuit. The short-circuited gap is readily sensed by the EDM electrode positioning circuit and mechanism, and the electrode and workpiece are separated to terminate the arc.

Burring and coking frequently occur when the current duty cycle exceeds 40 percent and do not result in a continuous sustaining current or DC arc. It is likely to occur in any pulsed EDM apparatus whether independently timed, self-timed or employing a basic relaxation type power supply. In any case, conventional sensing and positioning mechanisms are unable to distinguish between localized or spotty discharges which cause the phenomena and the normally uniform discharge patterns.

Although the phenomena are not perfectly understood, the earliest visible stages of coking are characterized by burring around the periphery of the workpiece cavity. Initially the burrs are of the workpiece material. In latter stages, a material resembling graphite (possibly carbon from cracking of the dielectric fluid) commences to buildup rapidly and usually at a single location in the EDM gap between the workpiece and the electrode. The material segregates itself into discreet and separated blobs attached to the workpiece and the electrode tool respectively. The blobs are spaced from one another directly across the EDM gap.

Unfortunately, these spaced blobs or clinkers do not short circuit the EDM gap, which ordinarily would cause the servomechanism to withdraw the electrode. Conventional gap width sensing means are unable to distinguish between a normal discharge pattern and the concentrated or localized series of repetitive discharges which are now confined principally to the space directly between the clinkers. Known forms of EDM control circuits, therefore, cannot prevent the formation of burring and coking nor sense the presence of these phenomena once commenced and terminate the EDM operation. Present-day EDM apparatus, in many applications, is limited to about 40 percent duty cycle, for the phenomena are not reversible. Instead, continued operation merely aggravates the condition.

My researches indicate that burring and coking phenomena are initiated by random concentrations of adjacent sparkovers between the workpiece and electrode tool. The chances for the occurrence of these random concentrations or localized sparkovers increase sharply with increase in repetitive discharge rates. Concentrated discharges cause minutely localized heating of the workpiece with the result that the gap spacing at this point initially and locally remains ionized, for a somewhat longer interval. Nonuniform de-ionization of the EDM gap further concentrates the discharges at this point or points and results at the outset in formation of burrs. Very quickly one or a few of the burrs predominate in size with the result that the EDM gap spacing at this point or points remains ionized for many microseconds (perhaps as high as 20$\mu$sec.) and thereafter permits an avalanche of concentrated discharges. Normal gap de-ionization occurs in a matter of a very few microseconds. The workpiece burr and the juxtaposed points of the tool, within a very short interval, attain an elevated temperature sufficient for localized cracking of the dielectric fluid and the formation of carbon deposits at these points.

As the deposits or clinkers enlarge, known forms of positioning means can sense only that the EDM gap is diminishing and can institute only a "normal" corrective action, resulting in slight withdrawal movements of the electrode tool. This ineffective "corrective" action merely widens the EDM gap and permits the deposits to increase in size. In consequence, the burring and coking conditions are aggravated.

Previous attempts to solve this problem are unsophisticated at best and impose severe productional limitations. The usual approach, in many EDM applications, has simply been the limitation of the current duty cycle to 40 percent or less. This limits both the repetitive discharge rate and the maximum rate of material removal. Apparently, a higher percentage duty cycle does not allow complete de-ionization at the aforementioned points of localized or concentrated discharges. In consequence, burr formation rapidly occurs as a prerequisite to coking or clinkering. As a matter of interest, I have discovered that burr formations will reoccur at the same locations on the workpiece although the workpiece is temporarily removed from the EDM apparatus and the burrs machined off.

Another equally unsatisfactory approach to this problem has been to substitute a graphite electrode for the usual metallic electrode and to reverse the normal polarities of the tool and workpiece. With the graphite tool now positive, it has been found that concentrated discharges, burring and coking are eliminated. However, the material removal rate is reduced almost to half that achieved with normal EDM polarity and electrode materials.

There are of course a number of known EDM control circuits for monitoring individual EDM pulses or gap discharges. Examples of these circuits are the U.S. patents to Webb, Nos. 3,018,411 and 3,178,551, both of which disclose per-pulse cutoff circuitry for machining power, short circuit protection. In the earlier Webb patent, the EDM power supply is interrupted when a rising gap voltage fails to raise to a sufficiently high level or an existing gap discharge falls below a minimum acceptable level. In the latter Webb patent, the EDM process is similarly terminated when any gap discharge induces a machining current above a predetermined maximum. In each of the Webb circuits, the pulses are instantaneously interrupted or terminated to obviate a gap short circuit, rather than merely delayed or otherwise modified to permit localized de-ionization of the EDM gap. The problems of burring and coking are not recognized, and neither Webb patent discloses means for increasing the percent duty cycle of EDM operations.

I am also aware of British Pat. No. 788,366 which attempts to increase the rate of material removal in EDM apparatus by varying the value of the capacitance charging resistance from an extremely low value during the charging of the capacitor to an extremely high value during discharging thereof. Insofar as increasing the percentage duty cycle of the discharge gap current, the British patent would appear to be self-defeating as the gap cycle apparently is interrupted after each capacitor discharge has occurred. The British patent likewise is not cognizant of the problem of burring and coking, and there is no disclosure of means for delaying or otherwise changing the gap voltage cycle for de-ionization purposes.

It is evident, then, once the conditions of burring and coking commence, that it is impossible to eliminate the conditions without manually terminating the EDM process. The only practical solution to this problem lies in obviating the occurrence of severely localized gap discharges which lead to the burring and coking phenomena.

I have discovered that a harbinger of these phenomena exists in the wave form of the instantaneous gap voltage. The instantaneous values of the gap voltage commence to fall slowly from pulse to pulse and thus invariably indicates the approach or commencement of the phenomena. As coking continues the drop in gap voltage approaches a limiting value equal to about two-thirds of the normal EDM gap voltage. As EDM pulse widths go, a comparatively long time of about 3 milliseconds is required for the falling instantaneous gap voltage to reach this limiting value.

My present invention eliminates the burring and coking phenomena by detecting conditions productive of the phenomena before any damage to the workpiece occurs. By immediately and substantially increasing the off-time of the pulses or by otherwise modifying the pulses to decrease temporarily the percent duty cycle, the incipient conditions which would result in burring and coking can be eliminated. In either a self-timed or relaxation-type power supply a suitable sensing and timing circuit is utilized to delay momentarily or otherwise modify a few of the discharge pulses following sensing of the incipient conditions by the circuit. In the case of an independently timed EDM power supply the frequency of the repetitive discharges can be momentarily decreased.

Although the application of the sensing and control principles herein to independently timed power supplies will be evident from the forthcoming detailed description, the principles of my invention are primarily described in conjunction with a relaxation power supply and with the power supplies described and claimed in the aforementioned copending application.

I accomplish these desirable results by providing a power supply for electric discharge machining apparatus and the like, said power supply including circuit means for establishing electric discharges at a given repetitive rate across a discharge gap forming part of said apparatus, a voltage detecting circuit coupled across said gap for developing an output signal when the instantaneous voltage across said gap falls below a predetermined level, and a control circuit coupled to said detecting circuit and to said circuit means for momentarily lowering said discharge rate until said instantaneous voltage is at or above said predetermined level.

I also desirably provide a similar power supply wherein said circuit means includes a first circuit path for supplying pulses to said gap at said given discharge rate and a second circuit path for supplying pulses to said gap at a slower rate, and said control circuit includes switching means for selectively energizing said circuit paths in response to said signal.

I also desirably provide a similar power supply wherein said voltage detecting circuit includes a semiconductive switch, a voltage dividing network coupled across said gap and to said switch, and a source of balancing potential coupled to said switch.

I also desirably provide a similar power supply wherein a third circuit path is provided for supplying pulses at a still faster rate to said gap, additional switching means are coupled in said third circuit path, and second voltage detecting circuit is coupled across said gap and to said additional switching means for closing said additional switching means when the instantaneous gap voltage attains a second predetermined voltage level.

I also desirably provide a similar power supply wherein said circuit means includes a pulse-prolonging circuit for prolonging the flow of current across said gap for a predetermined interval following the initiation of each of said discharges.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
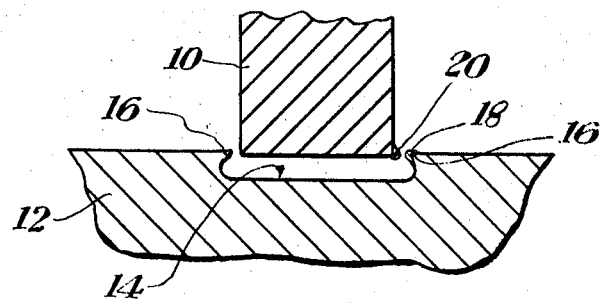
FIG. 1 is a partial, cross sectional view of an electrode tool and workpiece used in EDM apparatus and illustrating the occurrence of burring and coking phenomena.
Figure 3:
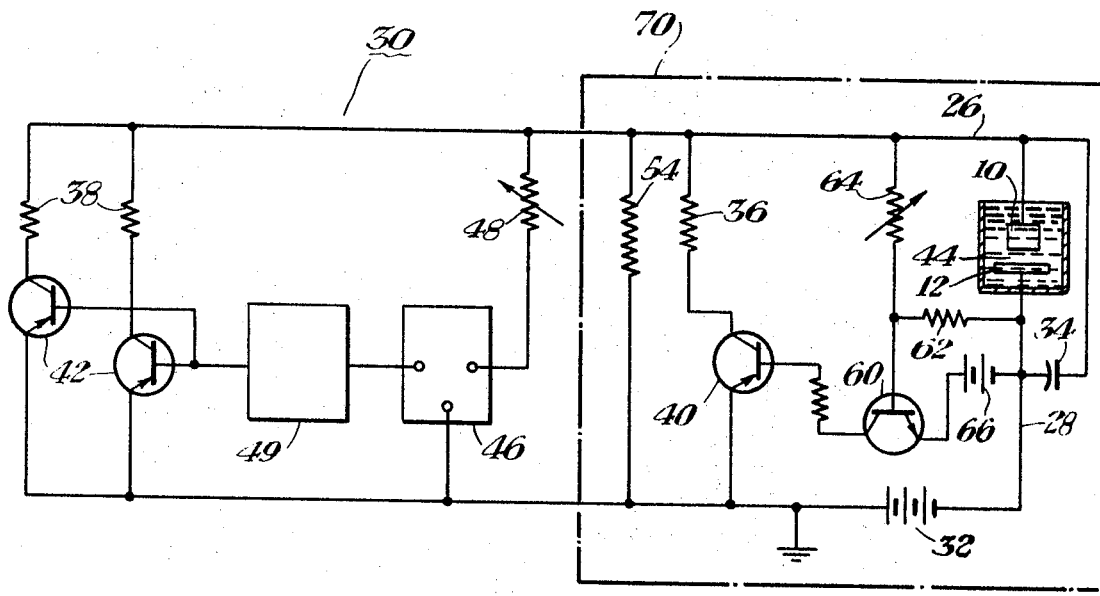
FIG. 3 is a schematic circuit view of one form of EDM power supply arranged in accordance with my invention.

FIG. 1 shows an enlarged section of an electrode 10 and workpiece 12 (shown schematically in FIG. 3). A machine cut 14 has been initiated in the workpiece 12 by gap discharges between the electrode 10 and the workpiece 12. Under certain conditions as mentioned previously, one or more burrs 16 form on the periphery of the machining cut 14. After a relatively short interval a spaced coke or clinker formation 18—20 is formed respectively on one or more of the burrs 16 and on the immediately juxtaposed surface of the electrode 10.

Figure 2:
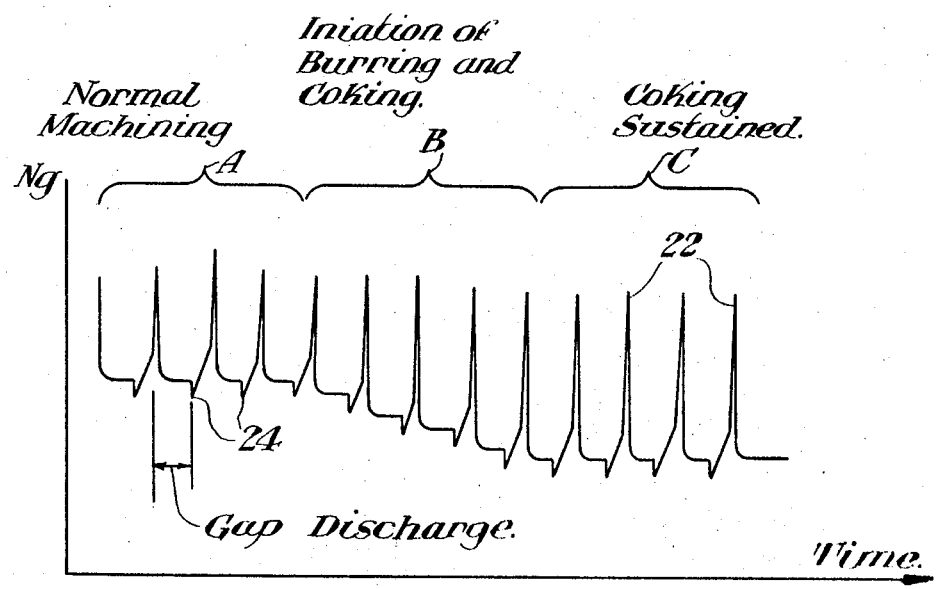
FIG. 2 is a graphical representation of the drop in instantaneous EDM gap voltage which harbingers the commencement of the burring and coking phenomena.

Commencement of the burring and coking phenomena is accompanies y a drop in instantaneous EDM gap voltage, as evidenced by gap voltage curve 22 (FIG. 2). The initial portion A of the curve 22 is indicative of the normal machining gap wave form. The small but sudden voltage dips 24 occurring at the ends of the discreet gap discharges are occasioned by the stray inductances of the conductors 26, 28 connected respectively to the tool 10 and workpiece 12 (FIG. 3). The voltage dips 24, as explained hereinafter in connection with FIG. 3, can be utilized to provide convenient sensory criteria for the operation of the circuit of FIG. 3.

Again, in FIG. 2, incipient burring and coking are denoted by the group of gap discharges bracketed at B. The development of these phenomena occurs with extreme rapidity with the gap discharges comprised in the bracket B occurring in the space of 3 milliseconds, more or less. Thereafter, sustained buildup of the coking condition continues at a reduced but uniform gap voltage as denoted by bracket C.

I have developed a power supply circuit which is capable of sensing the drop of instantaneous gap voltage below a predetermined value and to detect the beginnings of the burring and coking phenomena, i.e., the earliest gap discharges in the group of discharges bracketed at B (FIG. 2). As explained below in connection with the circuit of FIG. 3, my novel power supply circuit is then capable of delaying subsequent gap discharges for intervals of a few microseconds each during which time localized gap ionization (caused by concentrated gap discharges) disappear, and the burring and coking phenomena are eliminated. Consequently, my circuit is capable of percent discharge current duty cycles in the neighborhood of 99.5 percent and higher, in contrast to the previous maximum of about 40 percent.

Figure 4:
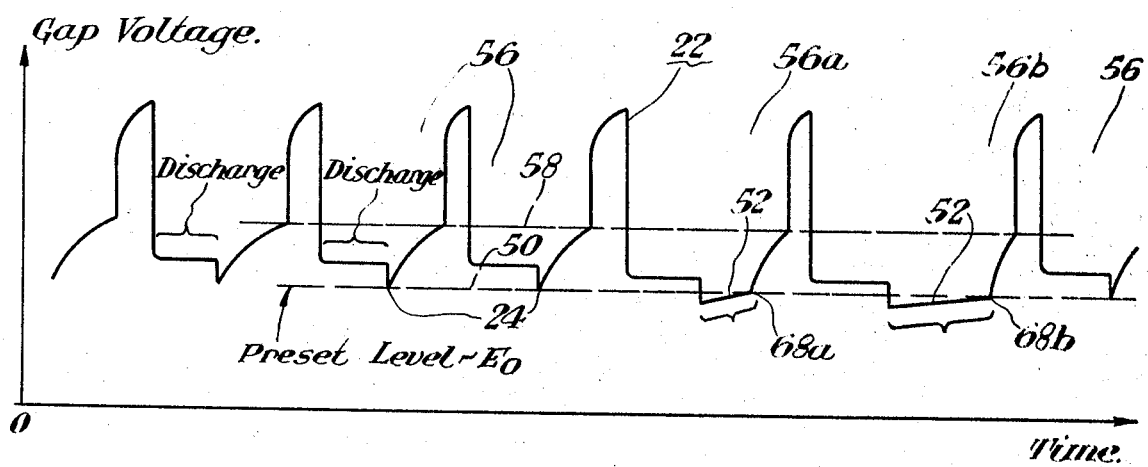
FIG. 4 is a graphical representation of instantaneous EDM gap voltage, which illustrates the corrective action of my novel power supply circuit.

The structure and operation of my novel power supply circuit 30 is depicted in FIGS. 3 and 4 of the drawings. As indicated previously, the burring and coking eliminational features of my invention can be applied with equal facility to independently timed and self-timed power supply circuits (not shown). However, these features of my present invention desirably are incorporated in a basic form of the self-timed power supply circuit disclosed in the aforementioned copending application. In this way the maximum potential of my present invention is utilized in those applications where burring and coking are most apt to occur, as the self-timed power supply circuits of the copending application are capable of considerably higher percentage of discharge current duty cycle than in the case of known power supplies.

The exemplary embodiment of FIG. 3, therefore, includes a source 32 of DC capacitance charging voltage, EDM gap capacitance 34, pilot or slow capacitance charging resistance 36 and power or fast charging resistance 38. Suitable switching means are provided for charging the gap capacitance 34 at a slower rate during de-ionization of the gap and thereafter at a faster rate by switching charging resistances 36, 38 alternately into the circuit. The operation of the circuit thus far described is set forth in detail in the aforementioned copending application.

In brief, the gap capacitance 34 is initially charged at a relatively slow rate through the pilot resistance 36 coupled in series with the capacitance 34, the source 32, and a normally on semiconductive switch 40 or the like. As soon as the gap has de-ionized a normally off semiconductive switch 42 or the life is closed to charge the capacitor 34 at a much faster rate through power charging resistance 38.

When the voltage of EDM gap 44 has risen to a predetermined value 58 (FIG. 4), the transistor switch 42 is turned on by keying circuit 46 coupled across the EDM gap 44 in series with a current limiting resistance 48. A suitable form of the keying circuit 46 is depicted in FIG. 4 of the aforementioned copending application. The output of the keying circuit 46 is coupled to the base of the switching transistor 42 to turn the latter on (at gap voltage level 58, FIG. 4) which in turn establishes the fast or power charging rate of the capacitor 34 as set forth in the copending application.

If desired, a pulse-prolonging circuit 48 can be coupled between the keying circuit 46 and the base of the transistor 42 to prolong the flow of gap current after each discharge of the capacitor 34. Use of the pulse-prolonging circuit 48 attains the maximum possible percentage duty cycle at the EDM gap 44. A suitable form of pulse-prolonging circuit is illustrated in FIG. 8 of the aforementioned copending application.

Depending upon the specific application of the invention and the maximum charging voltages and discharge currents that may be applied to the gap capacitor 34, a bank of parallel switching transistors 42 and power charging resistances 38 can be utilized.

In accordance with my present invention, I provide means for sensing a drop in the instantaneous gap discharge voltage to a predetermined voltage level denoted exemplarily by dashed horizontal line 50 in FIG. 4. I have determined that the incipient burring phenomenon will not permanently mar the workpiece if the instantaneous gap voltage does not fall below voltage level 50 (FIG. 4) at a maximum or normal percent duty cycle. Therefore, I detect the drop of any part of the gap voltage curve 22 (in this case the dips 24) below the present voltage level 50 which drop harbingers the burring and coking phenomena. The dips 24 also represent the beginnings of the subsequent gap capacitor charging cycle. I then provide circuit means for delaying the beginnings of the succeeding capacitance charging and discharging cycles until the instantaneous gap voltage rises entirely above the minimum level 50. These delays are represented by voltage curve portions 52, of the gap voltage curve 22 (FIG. 4). At the same time, I arrange for a very slow capacitance charging rate during the intervals 52 not only to prevent distinguishment of the gap discharge but also to ensure only a negligible effect upon the percent gap current duty cycle. The very slow charging intervals (curves portions 52) are at most a few milliseconds in duration but are sufficient for the complete de-ionization of the locally overheated gap points, which otherwise would result in burr formation.

Taking the aforesaid considerations in reverse order, I provide the very slow capacitance charging rate through the use of a very high or leakage resistance 54 (FIG. 3) which is coupled in series with the source 32 and the gap capacitor 34. A brief inspection of the FIG. 3 circuit reveals, that, under normal machining conditions, the leakage charging resistance 54 is effectively bypassed by either the pilot or slow charging resistance 36 or the power or rapid charging resistance means 38 except when both transistor switches 40, 42 are turned off.

As stated above, and explained in greater detail in the aforementioned copending application, the normally opened transistor switch or switches 42 for the power charging resistance means 38 is turned on during each gap discharge cycle 56 when the instantaneous gap voltage attains the present level 58 (FIG. 4).

On the other hand, the normally on pilot charging transistor switch 40 is turned off, in accord with my present invention, only when the incipient burring and coking phenomena are detected by a voltage detecting circuit including a semiconductive switch 60 or the like. In this example, the switch 60 is a transistor to the base electrode of which is connected a voltage divider circuit including resistor 62 and potentiometer 64. The resistances 62, 64 are connected across the EDM gap 44 and for example are connected respectively to the workpiece 12 and electrode tool 10. The resistances 62, 64 develop a voltage which is proportional to the gap voltage.

A source 66 of standard of reference voltage is coupled to the workpiece 12 and through the emitter-collector circuit of transistor 60 to the base of the normally on pilot charging switch 40.

As long as the divider voltage is above that of the source 66, the transistor switch 60 remains on and with it the transistor switch 40. Under these conditions, the normal machining operation continues with effective alternation of the charging resistances 36, 38 throughout each gap voltage cycle 56 (FIG. 4).

The equivalence of the voltage divider (62—64) voltage and the standard voltage 66 determines the preset minimum gap voltage level 50 (FIG. 4). When the lowest point 24 of the gap voltage curve 22 drops below the minimum preset voltage 50, the commencement of the undesirable burring and coking phenomena are indicated and the voltage detector transistor 60 is turned off and with it the pilot charging transistor 40.

At these times (curve portions 52) the power transistor switch or switches 42 likewise cannot be turned on until transistor switch 40 is restored to its normal operating condition. As shown in FIG. 4 the interruptions 52 of the gap voltage cycles 56a, 56b are variably limited by the very slow charging of the gap capacitor 34 through leakage resistance 54 until the gap voltage returns to the minimum voltage level 50 at points 68a and 68b respectively (FIG. 4). It will be understood that one or more delayed gap cycles 56a or 56b may be established by the detector transistor switch 60 and the pilot transistor switch 40 depending upon the severity and concentration of the localized gap discharges and the extent of the attendant gap voltage drop. In any event after one or more delayed cycles 56a or 56b the conditions contributing to the burring and coking phenomena disappear, and the succeeding gap voltage cycles 56 no longer fall below the predetermined gap voltage 50 and the normal machining operation resumes.

EDM conditions naturally vary with differing workpiece and electrode materials and accordingly I provide a potentiometer or variable resistance 64 for adjusting the predetermined voltage level 50. For the same reasons, I provide a variable load resistance 48 for the keying circuit 46 for the purpose of adjusting the gap voltage level 58 at which the faster or power charging rate through power resistance means 38 is commenced.

The power supply circuit of FIG. 3 can be rearranged as a relaxation type power supply circuit 70 simply by omitting the power charging resistance means 38, the power resistor switching means 42, the keying circuit 46, the pulse-prolonging circuit 49 and the variable load resistance 48. In this case the gap capacitance 34 is always charged at a single rate as determined by the charging resistance 36 under normal machining conditions. At the beginning of the aforementioned burring and coking phenomena, the capacitance 34 temporarily is charged very slowly for a few gap voltage cycles through the leakage resistance 54 as described above.

From the foregoing it will be apparent that novel and efficient forms of EDM power supply circuits have been disclosed. According to the invention the circuit senses the imminence of the burring and coking phenomena when the instantaneous gap voltage falls below the predetermined voltage level 50 (FIG. 4). Upon this occurrence, the gap discharge current is interrupted for substantially the longer intervals (curve portions 52—FIG. 4), temporarily necessary for complete gap de-ionization until the conditions productive of the phenomena disappear. At all other times, the EDM operation proceeds in a normal manner, and, in the circuit of FIG. 3, gap current duty cycles of the order of 99.5 percent are attainable.

The application of my invention to self-timed and relaxation power supply circuitry is purely exemplary. The principles of the invention can be applied with equal facility to any EDM power supply, and this application will be obvious to those schooled in the art.

While I have shown and described certain presently preferred embodiments of the invention and have illustrated certain presently preferred methods of practicing the same, it is to be distinctly understood that the invention is not limited thereto but may be otherwise variously embodied and practiced within the scope of the following claims.

I claim:

1. A power supply for electric discharge machining apparatus and the like, said power supply including circuit means for establishing cycle voltage pulses and electric discharges at a given repetitive rate across a discharge gap forming part of said apparatus, a voltage detecting circuit coupled across said gap for developing an output signal when the instantaneous voltage across said gap falls below a predetermined level above that which exists at short circuit, and a control circuit coupled to said detecting circuit and to said circuit means for lowering said repetitive rate, said control circuit being responsive to said predetermined level to impose a relatively slower voltage rise on at least one of the subsequent voltage pulses.

2. The combination according to claim 1 wherein said circuit means includes a first circuit path for supplying pulses to said gap at said given discharge rate and a second circuit path for supplying pulses to said gap at a slower rate, and said control circuit includes switching means for selectively energizing said circuit paths in response to said signal.

3. The combination according to claim 1 wherein said voltage detecting circuit includes a semiconductive switch, a voltage dividing network coupled across said gap and to said switch, and a source of balancing potential coupled to said switch.

4. The combination according to claim 1 wherein said circuit means includes a pulse-prolonging circuit for prolonging the flow of current across said gap for a predetermined interval following the initiation of each of said discharges.

5. The combination according to claim 2 wherein said circuit paths include capacitance means coupled across said gap for discharging thereacross and are defined by relatively high and low charging resistance means connected in series with said capacitance means and with a source of capacitance charging potential.

6. The combination according to claim 2 wherein said switching means include a first semiconductive switch, said voltage detecting circuit includes a second semiconductive switch, a voltage dividing circuit coupled across said gap and to a control electrode of said second semiconductive switch, and a source of balancing voltage coupled through an emitter-collector circuit of said second semiconductive switch to a control electrode of said first semiconductive switch.

7. The combination according to claim 1 wherein said control circuit additionally is capable of momentarily lowering the repetitive rate until said instantaneous voltage is at or above said predetermined level.

8. The combination according to claim 7 wherein said control circuit is further capable of restoring said given repetitive rate across the discharge gap following return of said instantaneous voltage to values at or above said predetermined level.

9. The combination according to claim 1 wherein said control circuit additionally is responsive to a second and higher predetermined voltage level to impose a relatively steeper voltage rise on each of said voltage pulses.

10. A power supply for electric discharge machining apparatus and the like, said power supply including circuit means for establishing electric discharges at a given repetitive rate across a discharge gap forming part of said apparatus, a voltage detecting circuit coupled across said gap for developing an output signal when the instantaneous voltage across said gap falls below a predetermined level, and a control circuit coupled to said detecting circuit and to said circuit means for momentarily lowering said discharge rate until said instantaneous voltage is at or above said predetermined level said circuit means including a first circuit path for supplying pulses to said gap at said given discharge rate and a second circuit path for supplying pulses to said gap at a slower rate, said control circuit including switching means for selectively energizing said circuit paths in response to said signal, a third circuit path for supplying pulses at a faster rate to said gap, additional switching means coupled in said third circuit path, and a second voltage detecting circuit coupled across said gap and to said additional switching means for closing said additional switching means when the instantaneous gap voltage attains a second predetermined voltage level.

11. The combination according to claim 10 wherein each of said detecting circuits include variable impedance means for variably selecting said first-mentioned and said second voltage levels in correspondence to de-ionization of localized and generalized gap spacings respectively.

12. The combination according to claim 10 wherein said third circuit path includes a pulse-prolonging circuit for prolonging the flow of gap current during a predetermined interval following the initiation of each of said discharges.